(No Model.) 5 Sheets—Sheet 1.
H. B. HAPPE.
WIRE NAIL MACHINE.
No. 397,592. Patented Feb. 12, 1889.
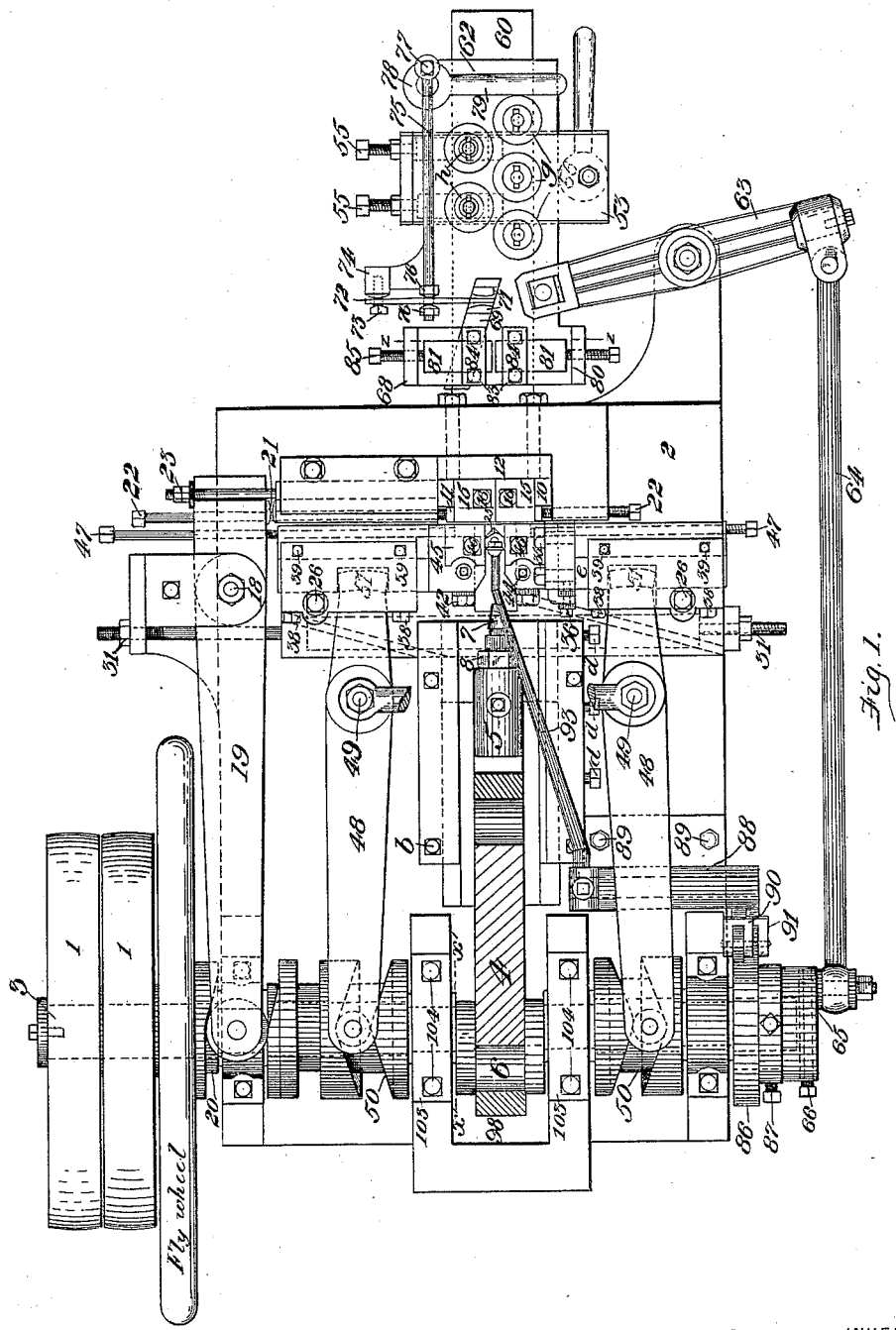
WITNESSES:
INVENTOR:
Henry B. Happe
BY
W. Bakewell & Sons
ATTORNEYS

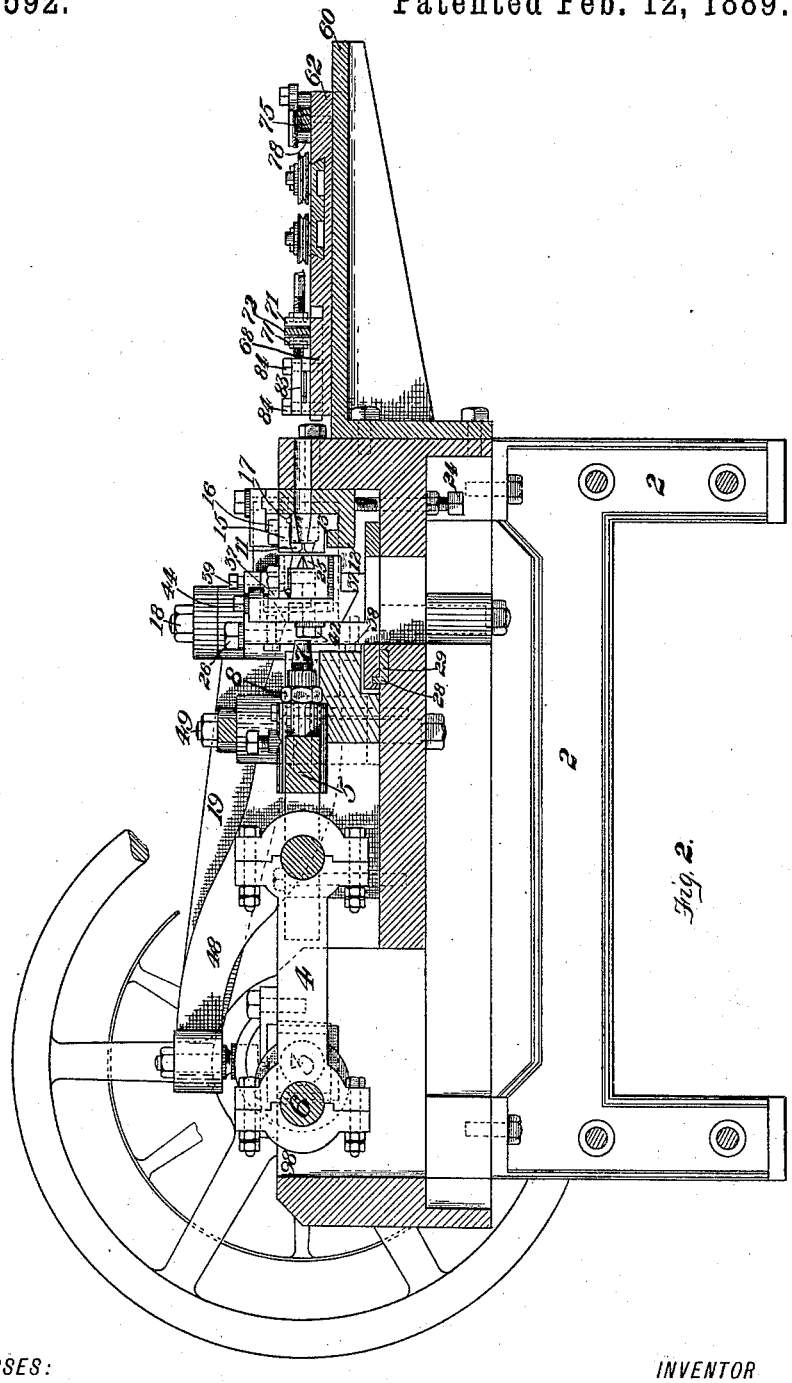

(No Model.) 5 Sheets—Sheet 3.
H. B. HAPPE.
WIRE NAIL MACHINE.
No. 397,592. Patented Feb. 12, 1889.
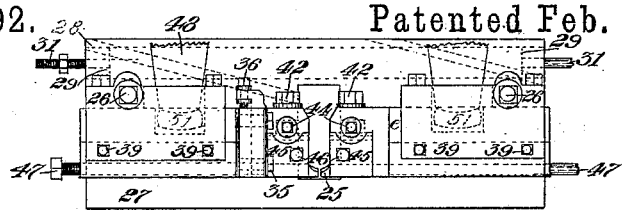
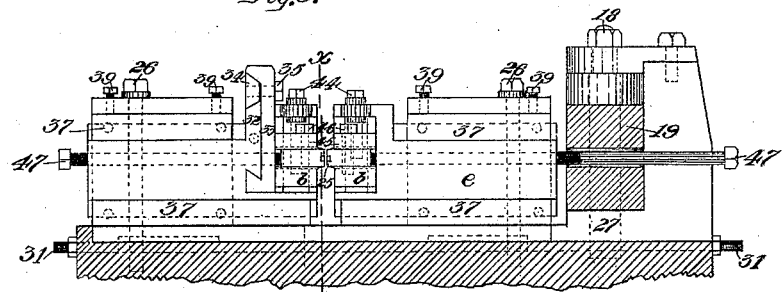
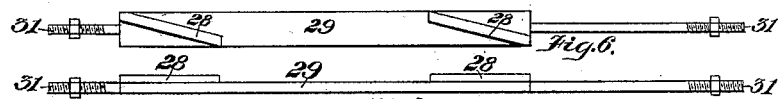
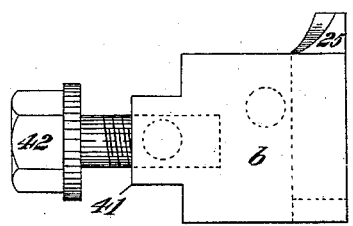
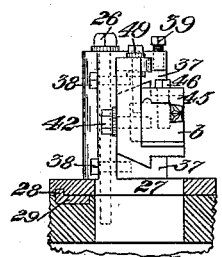
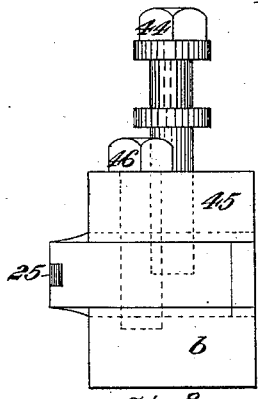
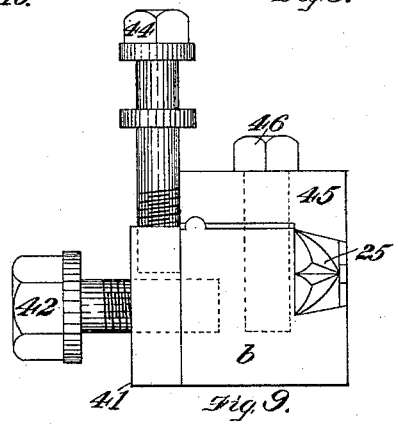
WITNESSES:
W. B. Corwin
H. L. Gill.
INVENTOR,
Henry B. Happe
BY W. Bakewell & Sons
ATTORNEYS.

(No Model.) 5 Sheets—Sheet 4.
H. B. HAPPE.
WIRE NAIL MACHINE.
No. 397,592. Patented Feb. 12, 1889.
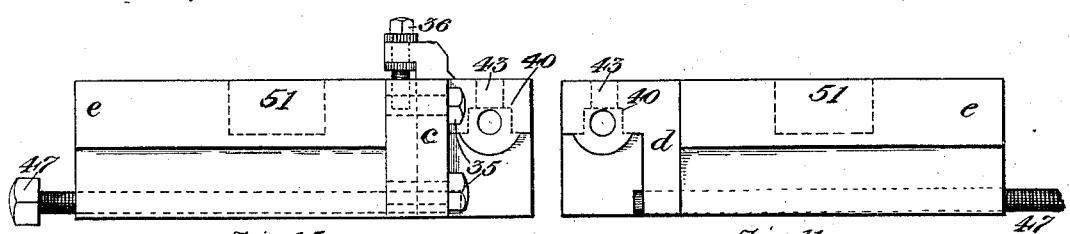
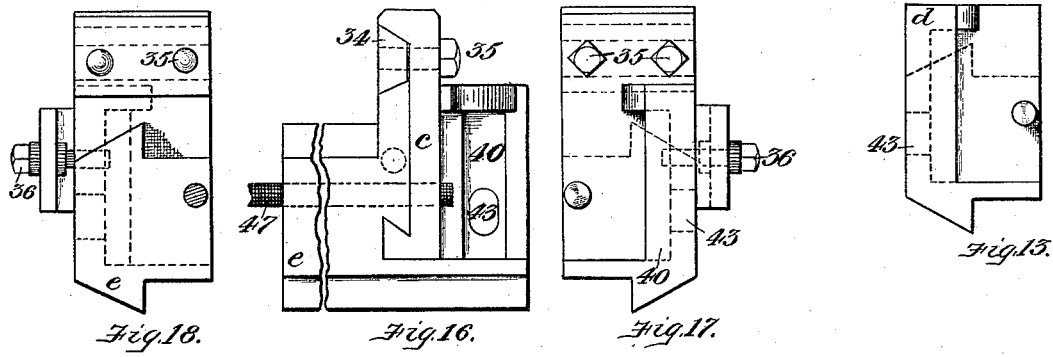
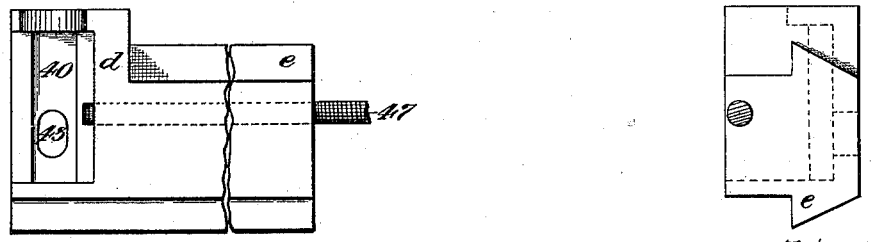
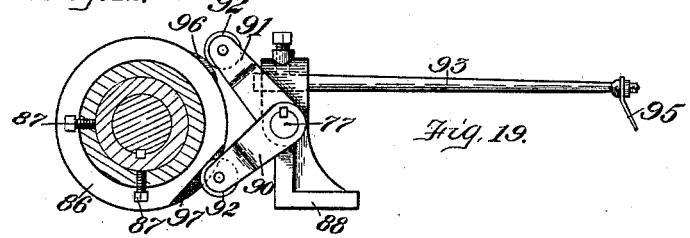
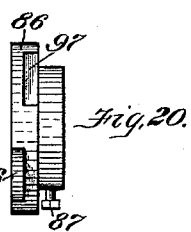
WITNESSES:
INVENTOR
Henry B. Happe
BY
W. Bakewell & Sons
ATTORNEYS

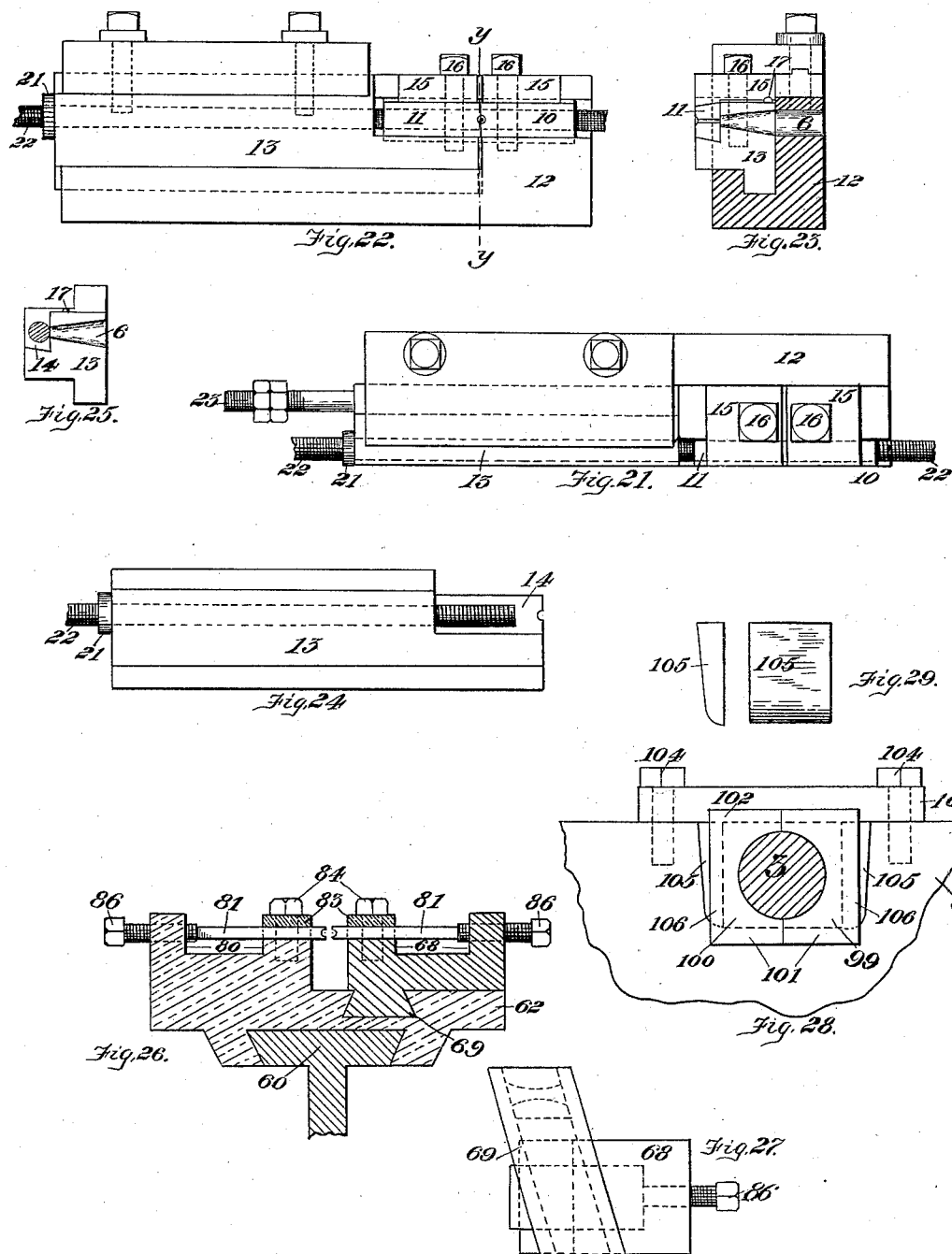

UNITED STATES PATENT OFFICE.

HENRY B. HAPPE, OF PITTSBURG, PENNSYLVANIA.

WIRE-NAIL MACHINE.

SPECIFICATION forming part of Letters Patent No. 397,592, dated February 12, 1889.

Application filed February 16, 1888. Serial No. 264,208. (No model.)

*To all whom it may concern:*

Be it known that I, HENRY B. HAPPE, of Pittsburg, in the county of Allegheny and State of Pennsylvania, have invented a new and useful Improvement in Wire-Nail Machines; and I do hereby declare the following to be a full, clear, and exact description thereof, reference being had to the accompanying drawings, forming part of this specification, in which—

Figure 1 is a plan view of the machine. Fig. 2 is a vertical central longitudinal section thereof. Fig. 3 is a plan view of the cutter-housing. Fig. 4 is a front view thereof. Fig. 5 is a vertical cross-section on the line $xx$ of Fig. 4. Fig. 6 is a plan view of the key-bar which I employ for adjusting the cutter-housing. Fig. 7 is a side view thereof. Fig. 8 is a side view of the saddle of one of the cutters, showing the cutter clamped therein. Fig. 9 is an end view thereof. Fig. 10 is a bottom plan view thereof. Fig. 11 is a plan view of the cutter-head which carries the cutter and its saddle. Fig. 12 is a side view. Fig. 13 is an end view of one of the cutter-heads. Fig. 14 is a view of the rear end thereof. Fig. 15 is a plan view of the adjustable cutter-head. Fig. 16 is a side view, Fig. 17 is an end view, and Fig. 18 is a rear end view, thereof. Fig. 19 is a side view of the knock-off bar by which the nail is detached and discharged from the machine. This view shows, also, the cam on the main shaft by which the knock-off lever is operated. Fig. 20 is a plan view of this cam. Fig. 21 is a plan view of the gripping-die block, which holds the gripping-dies and directs the movement of the movable die. Fig. 22 is a front view thereof. Fig. 23 is a vertical cross-section on the line $yy$ of Fig. 22. Fig. 24 is a side view of the moving die-holder. Fig. 25 is a front end view thereof. Fig. 26 is a vertical cross-section through the feed-carriage, the section being taken on the line $zz$ of Fig. 1, for the purpose of illustrating the operation of the feed-dogs. Fig. 27 is a bottom plan view of the movable feed-dog. Fig. 28 is a vertical cross-section on the line $x'x'$ of Fig. 1, showing in side elevation the pillow-block, which constitutes one of the features of my invention. Fig. 29 is a side and end view of the key or gib used in connection with the pillow-block.

Like symbols of reference indicate like parts in each.

My invention relates to an improvement in that class of nail-machines in which the wire is passed through the machine from a coil, and after the proper amount of wire has been fed beyond the gripping-dies to form a nail it is seized by the dies and cut. As soon as the cutters open, a knock-off lever descends and disengages the nail. A heading-die then advances and upsets the projecting end of the wire to form a head for the next nail, the dies are retracted, and another portion of the wire is fed, which is in turn cut. This operation is thus repeated continuously.

In the drawings, 2 represents the frame or bed of the machine, and 3 is the main driving-shaft, which is suitably journaled at the end of the frame and is driven by the usual belt-pulley, 1.

5 is the reciprocating hammer-stock or plunger which carries the heading-die. It is driven by a yoke, 4, which is suitably connected with a crank-pin, 6, on the main shaft.

7 is the heading-die, which is adjusted lengthwise on the hammer-stock by means of the nuts 8, for the purpose of varying the amount of stock taken up in forming the head of the nail. The hammer-stock slides in a suitably-mortised seat on the bed-plate, and is caused to make a complete reciprocation at each revolution of the main shaft. The gripping-dies 10 and 11 are shown in detail on the fifth sheet of the drawings, and are also shown in Figs. 1 and 2. The stationary die 10 is set in a seat or recess of the die-block 12, which is adjustably fixed to the frame of the machine at right angles to the course of the wire. The moving die is set on a seat or recess formed in the face of a reciprocating die-holder, 13. (See Figs. 22 and 23.) This die-holder 13 is set in a longitudinal slideway or recess formed in the die-block 12, and the die 11 is held to its seat in the holder 13 by means of a cap, 15, having at its front end a projection or shoe which bears on the top of the die, and at the rear end has on its under face a transverse groove which fits on a rib, 17, of the holder 13. This rib forms a sort of pivot on which the cap 15 tilts. The cap is held in place so as to confine the die 11 in its proper position by means of a set-bolt, 16. The fixed die 10 is held to the die-block 12 by means of a second cap, 15, similarly arranged and adjusted. As shown in Fig. 23, the opposing faces of the die-block 12 and the die-holder 13 are suitably grooved to permit passage of the wire between the gripping-dies. The movable die-holder 13 is actuated by a lever, 19, which is fulcrumed at 18, and at its rear end has an anti-friction roller working in a lateral cam-groove, 20, on the main shaft. This cam-groove is formed by two laterally-inclined collars, one of which is fixed to the main shaft, while the other collar is fixed to or made integral with the fly-wheel and is concentric with the main shaft. By making this collar a part of the fly-wheel the size of the machine is reduced and it is made more effective in action.

At the front end of the lever 19 it is provided with a small piece or boss, 21, of tempered steel, which bears against a similar boss, 21, on the end of the die-holder 13. These bosses are screwed or dovetailed, one on the lever 19 and the other on the die-holder, and can be removed and replaced when worn out. The bolt 22 passes loosely through the lever 19, and is screwed in the reciprocating die-holder 13 and bears against the end of the die 11. The bore in the die-holder 13, through which the bolt 22 passes, is screw-threaded, so that by turning the bolt it may be moved longitudinally in either direction to secure the adjustment of the die 11. The die-holder 13 is advanced by the pressure of the steel boss 21 on the lever against its companion boss 21 at the rear end of the die-holder 13, and the die-holder is retracted in the back motion of the lever 19 by means of a puller-bolt, 23, which connects the lever with the die-holder, Fig. 1. By these means the moving die 11 is driven so as to approach and recede from the stationary die 10 at regular intervals of time. Both dies are vertically adjustable into alignment with the wire by means of a set-bolt, 24, which passes through the bed of the machine and bears against the bottom of the die-block 12. By turning this screw the whole die-block and the holders which are mounted thereon may be raised or lowered into the proper position.

I shall now describe the construction and operation of the cutters 25, which act to sever the wire in front of the face of the gripping-dies, leaving only sufficient wire projecting from these dies to form a head of proper size on the nail when it is struck by the advance of the heading-die.

Referring to Figs. 1 and 2 and to the figures on the third and fourth sheets of the drawings, the cutters 25 are fixed to adjustable saddles $b$, made separate from the reciprocating cutter-heads, and are provided with rearwardly-projecting shanks 41, for the purpose of adjustment.

Figs. 3, 4, and 5 show the cutter-housing 27, in which the cutter-heads travel to and from each other. It is set transversely of the machine, and is bolted to the bed-plate by bolts 26. In order to move the cutters to and from the gripping-dies for the purpose of varying the amount of stock in the head of the nail, I move the entire cutter-housing on the bed-plate of the machine by means of a key or bar, 29, which is set in a transverse groove on the bed of the machine beneath the cutter-housing and is provided with inclined ribs 28, which fit in corresponding grooves on the bottom of the housing, Figs. 3, 4, 5, 6, and 7.

The bar 29 is provided with projecting bolts 31, on which are arranged set-nuts, and by means of these nuts the bar 29 may be moved longitudinally, and in this longitudinal motion the inclined ribs 28 will advance or retract the entire cutter-housing, as will be readily understood. This is a very convenient and important feature of my invention, because it permits the easy relative adjustment of the cutters and dies.

There are two cutter-heads, $c$ and $d$, of which the cutter-head $d$ is fixed to or made integral with its shank $e$, which is movably mounted between suitable transverse gibs in the cutter-housing 27, and the second cutter-head, $c$, is made separate from its shank $e$, and is set in a dovetailed recess or seat on the face thereof. It is there held by a beveled key or gib, 34, and bolts 35, Figs. 3, 4, 15, and 16. This construction enables the movable cutter-head to be adjusted laterally lengthwise of the machine, so as to bring its cutter into alignment with the other cutter, by means of an adjusting-screw, 36, Figs. 1, 3, 15, 17, and 18, which is set in a bracket projecting from the cutter-head and fits in a threaded socket in its shank. The shanks $e$ of the cutter-head slide between gibs 37, Figs. 2, 4, and 5, which are bolted to the cutter-housing 27 by screws 38, and are provided with set-screws 39, bearing on the upper gibs, which afford means for taking up the wear.

I will now describe how the cutter-saddles $b$ are fixed on the cutter-heads.

As shown in Figs. 8, 9, and 10, the cutter-saddles have rearwardly-projecting shoulders 41, and the shoulder of each saddle fits within a vertical groove made in a bracket, 40, which projects from the cutter-head, (see the figures on Sheet 4,) the saddle being held firmly in place by a bolt, 42, which passes through a vertical slot, 43, in the bracket. By slightly loosening the bolt 42 the saddle can be adjusted vertically by means of the adjusting-screw 44, which passes through the bracket 40 and fits in the threaded socket in the saddle. The saddles of both cutters are similarly arranged. The cutters 25 are clamped to their saddles by means of caps 45 and bolts 46, constructed and arranged like the caps 15 and bolts 16 of the gripping-dies 10 and 11, before described. The cutters are adjusted lengthwise to and from each other by means of set-screws 47, Figs. 1, 3, and 4, which pass through the shanks e and bear directly on the cutters in the saddles. The cutter-shanks e are reciprocated in their slideways between the gibs 37, to move the cutters to and from each other for the purpose of severing the nails by means of levers 48, Figs. 1 and 2, having their fulcrums at the ends of a cross bar or brace, 49, and provided at their rear ends with rollers which fit in cam-grooves 50 on the main shaft 3. At the other end these levers fit in pockets 51 in the sliding shanks e. The oscillation of these levers causes the cutters to approach and to recede at regular intervals.

I will now describe the feeding mechanism of the machine.

The wire is fed from a coil (not shown) and passes between a parallel series of straightening-rollers, g and h, which are journaled on the surface of the feed-carriage 62. The journals of the rollers g are stationary on the feed-carriage; but the rollers h are journaled on a slide, 53, which fits in a mortised slide-way on the feed-carriage, and the journals of these rollers are set in slots in this slideway and are adjustable therein by set-screws 55. The two series of rollers are separable to permit adjustment of the wire by means of a cam, 56, which is journaled on the bottom of the slide 53 and bears against the side of the feed-carriage 62. The cam is operated by a hand-lever, 57, and its action is to move the slide 53, to move the rolls to and from each other.

The feed-carriage 62 has on its bottom a longitudinal mortised groove, which fits over a dovetailed slideway or track, 60, Figs. 1, 2, and 26. The carriage is reciprocated on this track by means of a lever, 63, which is connected with an adjustable eccentric, 65, by a pitman, 64. The lever 63 is pivotally connected with the feed-carriage 62, and as it oscillates it causes the feed-carriage to reciprocate back and forth on its track. There are two feed-dogs on the carriage 62. One of them, 80, is fixed to or forms part of the carriage, while the other dog, 68, has at its bottom a dovetailed rib, 69, which works in an inclined mortised groove on the carriage, so that when the dog moves in this groove the inclination of its movement will cause its approach to or recession from the fixed feed-dog 80. The feed-dogs have jaws 81, which are held in place by caps 83 and bolts 84, and are adjusted lengthwise by set-screws 85. The rib 69 of the movable dog 68 projects back of the dog and is provided with lugs 71, between which fits a spring, 72, confined at the end by bolts 73 on the feed-carriage, and in its middle connected by bolts 76 with a pitman-rod, 75, whose free end is pivotally connected to a crank-pin on a wheel, 78. This wheel is rotated by means of a hand-lever, 79.

The operation of the carriage in feeding the wire to the machine is as follows: When the carriage is moved forward, the friction of the wire on the end of the jaw 81 of the movable dog 68 causes the dog to move back in its inclined groove, bring it up toward the other dog, 80, and cause it to bite on the wire and to feed the wire forward. In the back motion of the feed-carriage the movement of the dog in the inclined groove causes it to recede from the other dog. The spring 72 exerts a continual pressure on the movable dog, tending to force it up to the other dog, 80, and causing it to take its initial hold on the wire when the carriage moves forward. This spring is kept in proper tension by the nuts 76. When it is desired to put a new strand of wire between the jaws of the dog, they are separated by means of eccentric 78, whose rotation acts on the spring 72 to move the movable dog in its inclined ways, and thereby to separate the dogs. This form of feed device is very efficient, and constitutes an important feature of my invention. Its advantage consists in the firmness of its hold on the wire and the rapidity with which the spring causes the feeding device to begin its action.

I shall now describe the construction and operation of the device which I employ for knocking off or disengaging the nail after it has been formed.

The knock-off cam 86, Figs. 1, 19, and 20, encircles the hoop of the adjustable eccentric-disk 65 on the main shaft, and is held in place on the shaft by set-screws 87. The knock-off bracket 88 is suitably bolted on the frame of the machine, and in this bracket is journaled a short shaft, 77, to which is keyed a double lever, 90 and 91, at the extremities of which are rollers 92, which bear against the peripheries of the cam 86. On this cam is a lug, 96, and a recess, 97, set at a distance from each other corresponding to the distance between the extremities of the arms 90 and 91 of the double lever. On the shaft 77 is also pivoted a knock-off lever or rod, 93, which has at its front end a projecting finger, 95, situated directly above the gripping-dies.

The rotation of the cam 86, acting on the lever 90 91 through the projection 96 and the depression 97, causes an oscillation of this lever, and also of the knock-off lever 93, at regular intervals of time, and it will be seen that it has a positive action in both directions. At each descent of the lever 93 its finger 95 engages the nail which has just been formed and knocks it away from the gripping-dies.

The main pillow-blocks 98, in which the main shaft has its central bearings, are peculiarly constructed. (See Figs. 1, 2, and 28.) These blocks are provided with two separate half-round boxes, 99 and 100, which are seated within the pillow-blocks and fit around the main shaft. These boxes are held in position by flanges 101 at the bottom, which fit against the sides of the pillow-block, flanges 102 at the top, which fit against the sides of a bridge-piece, 103, and tapered gibs or keys 105, which fit in the tapered spaces between the pillow-block and the sides of the boxes. These keys are prevented from sidewise motion by means of flanges 106 on the boxes. These keys may be easily removed by unscrewing the bolts 104 and taking off the bridge-piece 103. This affords easy means for inserting a proper amount of packing between the keys and the sides of the boxes to take up any wear on the bearings of the shaft. This is a very useful feature of my machine, and saves a great deal of time in keeping it in running order, because the greatest wear occurs on the central bearings of this shaft, and not on the bearings toward the end of the shaft.

In the operation of the machine the course of the wire is from the coil between the straightening-rolls of the feed-carriage, between the jaws of the feed-dogs, and between the gripping-dies 10 and 11 and the cutters 25, and the operation of the machine is as follows: Suppose the cutters to be separated and the gripping-dies to be holding the wire, the end of which projects slightly toward the heading-die. The latter then advances, and, engaging the projecting end of the wire, upsets it and forms a head for the nail, acting on these dies as on an anvil. Then as the heading-die recedes the gripping-dies separate and the feed-carriage moves forward to advance the wire a distance equal to the length of a single nail. Then the gripping-dies seize the wire, and the cutters approach and cut the wire, at the same time giving a point to the nail which has just been cut off. The cutters then recede and the knock-off lever descends, strikes the nail, and disengages it. The knock-off lever then recedes, and the operations as just described are repeated. The relative periods of motion of the several parts are adjusted by proper timing of their primary cams and eccentrics on the main shaft.

The advantage of my machine consists principally in its speed. All the parts are positive in their movements, and much time and labor are saved by the ease in adjusting the parts, particularly the gripping-dies and cutters and the feeding and straightening mechanism.

I claim—

1. In a wire-nail machine, the combination, with the driving-shaft, of a pillow-block, boxes in the pillow-block, and a key, substantially as and for the purposes described.

2. In a wire-nail machine, the combination, with cutters, of a housing whereon they are mounted, said housing being adjustably movable, and a sliding key bearing on the housing for moving the same, substantially as and for the purposes described.

3. In a wire-nail-cutting machine, the combination, with a longitudinally-adjustable housing for the cutter-heads, of cutter-heads mounted thereon, one of said cutter-heads being longitudinally adjustable thereon, substantially as and for the purposes specified.

4. In a wire-nail-cutting machine, the combination, with a longitudinally-adjustable housing for the cutter-heads, of cutter-heads mounted thereon, one of said cutter-heads being longitudinally adjustable on the housing, and laterally and vertically adjustable cutters mounted on the cutter-heads, substantially as and for the purposes specified.

5. In a wire-nail machine, the combination, with a lever, a cam having an incline and a groove, said lever being secured to one end of a rock-shaft, of two arms secured to the other end of said rock-shaft and provided with anti-friction rollers which bear upon said cam, whereby a positive motion is imparted to the rock-shaft, substantially as and for the purposes specified.

6. In a wire-nail machine, the combination, with a feed-carriage, of a movable feed-dog mounted thereon in an inclined slideway, substantially as and for the purposes described.

7. In a wire-nail machine, the combination, with a moving feed-carriage, of a feed-dog mounted thereon in a way inclined to the course of the wire, substantially as and for the purposes described.

8. In a wire-nail machine, the combination, with a movable feed-carriage, of a feed-dog mounted thereon in a way inclined to the course of the wire, and a spring which bears on the dog, substantially as and for the purposes described.

9. In a wire-nail machine, the combination, with a moving feed-carriage, of a feed-dog mounted thereon in a way inclined to the course of the wire, and a rod, 75, whereby the dog is moved, substantially as and for the purposes described.

10. In a wire-nail machine, the combination, with the two jaws of the feed-dog, of set-screws bearing on the jaws, whereby the opposite jaws are adjustable to and from a common center, substantially as and for the purposes specified.

11. In a wire-nail machine, the combination, with a moving feed-carriage, of a feed-dog mounted thereon in a way inclined to the course of the wire, a rod, 75, whereby the dog is moved, and an eccentric acting on the rod, substantially as and for the purposes described.

In testimony whereof I have hereunto set my hand this 1st day of February, A. D. 1888.

HENRY B. HAPPE.

Witnesses:
W. B. CORWIN,
JNO. K. SMITH.